United States Patent [19]

Parsons et al.

[11] Patent Number: 5,005,197
[45] Date of Patent: Apr. 2, 1991

[54] METHOD AND APPARATUS AS FOR TESTING A TELEPHONE LINE INTERFACE CARD

[75] Inventors: Gerald J. Parsons; Brian D. Greenwald, both of Chester Springs; John J. McGrath, Kennett Square; Stephen W. Andrasko, Drexel Hill, all of Pa.

[73] Assignee: Communications Test Design, Inc., West Chester, Pa.

[21] Appl. No.: 444,106

[22] Filed: Nov. 30, 1989

[51] Int. Cl.$^5$ .............................................. H04M 3/26
[52] U.S. Cl. ..................................... 379/21; 379/29; 379/27
[58] Field of Search .................. 379/29, 21, 27, 28

[56] References Cited

U.S. PATENT DOCUMENTS

| | | |
|---|---|---|
| 4,167,656 | 9/1979 | Durance et al. |
| 4,445,007 | 4/1984 | Forestier ................................. 379/27 |
| 4,540,857 | 9/1985 | Parsons et al. |
| 4,670,897 | 6/1987 | Parsons et al. ........................ 379/10 |
| 4,692,939 | 9/1987 | Parsons et al. ........................ 379/16 |

OTHER PUBLICATIONS

Specification Sheet for Wandel & Goltermann AMS-964 Test System 6/87.
Specification Sheet for Northern Telecom DMS-100 Digital line card 9/11/81.

*Primary Examiner*—Stafford D. Schreyer
*Attorney, Agent, or Firm*—Ratner & Prestia

[57] ABSTRACT

A telephone line card tester operates by transmitting test data to the digital port of a telephone line interface card, and by subsequently receiving the data which is transmitted from this card through the same digital port. Once received, the data pattern is compared with an expected data pattern. A difference between the received data and the expected data is indicative of a defect in the telephone line interface card. To meet telephone line interface card timing consideration, the transmission of data to the interface card and the analysis of data received from the card are performed by separate subsystems. To accomplish this task, the telephone line interface card is tested in a test fixture which includes a digital line interface card tester, and a communications test set. The communications test set is used for such functions as ring generation and line simulation. The digital line interface card tester is used to exercise the line interface card in a variety of signalling scenarios which simulate the operational environment of the line card. A user interface is also provided.

14 Claims, 9 Drawing Sheets

METHOD AND APPARATUS AS FOR TESTING A TELEPHONE LINE INTERFACE CARD

DESCRIPTION

1. Field of Invention

This invention is in the field of test systems and specifically directed to the testing of telephone line interface cards. In particular, apparatus and a method are set forth for real time error checking of test data and functionality in a telephone line interface card.

2. Background of the Invention

Telephone line interface cards are used to interface electronic central office switching systems with subscriber communications lines. Such interface modularity is desirable because switching systems and communications lines assume a variety of physical configurations and communications protocols.

In an exemplary telephone line interface card designed by Northern Telecom Corporation, a bidirectional data and command bus transfers information between the interface card and the switching system. Using this configuration, the switching system may send digitally encoded voice information and issue commands to the interface card. The interface card can transmit digitally encoded voice information and status messages back to the switching system.

Some prior art field testers for line interface cards operate by simulating the environments in which the cards operate to verify correct circuit responses. These testers are typically designed for unidirectional signal paths, that is to say, voice data and commands are sent to the line card on one bus and are received from the card on a separate bus.

Some telephone switching systems, such as the Northern Telecom DMS-100 Digital Multiplex Switching System use a single bidirectional communications path instead of the two unidirectional paths. In systems of this type, voice data, commands and the responses to the commands are sent in both directions between the central office switch and the line interface card via a single bus. Prior art field testers which use separate transmit and receive busses cannot be used directly to test an interface card of this type.

One way in which an interface card of this type may be tested is to physically remove it from the customer's location and transport it to a facility containing a "bed of nails" or in-circuit tester. Such testers consist of numerous probes which simultaneously make contact with the interface card at critical points. This allows for test signals to be injected into the circuit and for circuit responses to be monitored.

While bed-of-nails testers do provide accurate test results they are extremely expensive and lack portability.

Another type of tester uses a high-speed processor to alternately send and receive command, response and encoded data signals. An exemplary tester of this type is the AMS-964 test system available from Wandel & Goltermann. A tester of this type tends to be relatively large and expensive due to the performance requirements of its circuitry. Thus it may not be economical to purchase a separate tester for each central office controlled by a telecommunications company. Given the size of a tester of this type, it is also impractical to move the tester from site to site to test potentially defective line cards. Thus, with a tester of this type, it still may be desirable to ship the potentially defective line cards to a central facility for testing.

SUMMARY OF THE INVENTION

The present invention is a portable test fixture for digital line interface cards which transmit and receive data over a single bidirectional bus. The invention operates by transmitting test data to the digital port of a telephone line interface card, and by subsequently receiving the data which is transmitted from this card through the digital port. Once received, the data pattern is compared with an expected data pattern. A difference between the received data and the expected data is indicative of a defect in the telephone line interface card. To meet telephone line interface card timing considerations, the transmission of data to the interface card and the analysis of data received from the card are performed by separate subsystems.

According to a further aspect of the invention, the telephone line interface card is tested using a digital line interface card tester, and a communications test set. The communications test set is used for such functions as tone transmission and measurement, voltage measurement, ring generation and other operations which simulate the line environment in which a line interface card may operate. The digital line interface card tester is used to exercise the line interface card in a variety of signaling and voice scenarios which simulate the operational environment of the line card. A user interface is also provided.

DETAILED DESCRIPTION OF THE INVENTION

Figure 2:
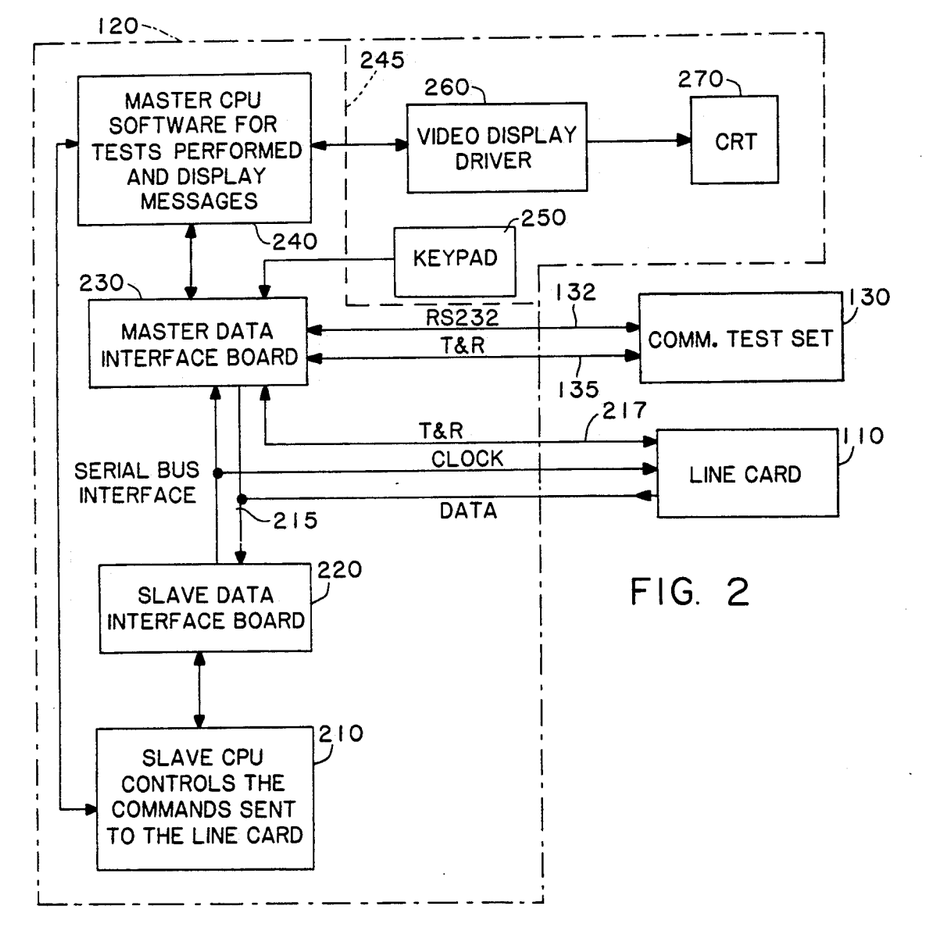
FIG. 2 is a block diagram of an exemplary telephone line interface card tester suitable for use in the test set up shown in FIG. 1.

The telephone line interface card tester is designed to be efficient and cost effective. Referring to FIG. 2, the architecture consists of a master processing unit (MPU) 240 and a slave processing unit (SPU) 210. The MPU and the SPU communicate with a line interface card under test 110 via a master data interface board (MDIB) 230 and a slave data interface board (SDIB) 220, respectively. In addition, the MDIB is coupled directly to a commercially-available communications test set 130.

Using this connection, the MPU 240, through the MDIB 230, can command the test set 130 to initiate various signalling and analog or digital voice sequences to simulate transmission line impairments, off-hook, on-hook conditions and ringing. In addition, the communications test set 130 may be used to measure analog voice frequency response and data transfer capabilities of the tested line card. An exemplary device suitable for use as the communications test set 130 is the 930A communications test set manufactured by Sage Instruments.

The telephone line interface card contains two ports: a network port and a central office port. The network port transmits and receives analog voice signals and transmits ring signals to the subscriber. The central office port exchanges digital control data and digitally encoded voice and tone signals with the central office digital switch. Pulse code modulation (PCM) may be used, for example, to encode voice and tone signals for transmission through the central office switch. In the exemplary Northern Telecom line interface card, for example, a ten-bit PCM sample value or a ten-bit command are sent to the line card at 62 microsecond intervals. These samples and commands are interleaved with ten-bit samples and responses received from the card and at 62 microsecond intervals.

A typical test situation is initiated when the MPU 240, through the MDIB 230, conditions the communications test set 130, to begin any of several predetermined signalling scenarios at the network port. The MPU 240 may then command the SPU 210 via the slave data interface board 220 to continually transmit a predetermined sequence of digital codes to the central office port 215. The line card under test 110, when properly functional, will then respond by transmitting a data stream to the MPU 240 via the central office port 215 and the master data interface board 230. While the SPU 210 is transmitting this sequence, the MPU 240 analyzes the previous sequence which has been received from the line card under test. In this manner the MPU 240 can ensure that the line card under test is functioning properly. Furthermore, this architecture allows test values to be analyzed for correctness, while new data values are being transmitted to the line card under test, thus simulating an actual operational environment. The analysis program running on the MPU 240 does not need to be concerned about the timing of data transmission to the line card 110 since this function is performed by the SPU 210.

The program listings shown in Appendix A and Appendix B correspond to the source code which is used by the SPU and the MPU, respectively.

Figure 1:
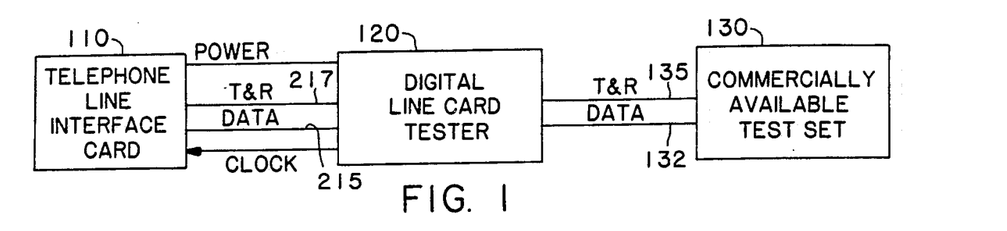
FIG. 1 is a block diagram of a test set up for telephone line interface cards.

In FIG. 1, a representation of a telephone line interface card test set up is shown. The digital line interface card tester 120 is capable of sending data signals to the telephone line interface card 110 via the bidirectional data bus 215 coupled to the central office port and of sending/receiving voice signals to/from the card 110 via a pair of conductors 135 coupled to the network port. These conductors are labeled tip and ring and are collectively referred to as the telephone transmission line. The telephone line interface card 110 is able to respond to these signals over the identical data line 215 and by tip and ring lines 217 which may be coupled to the lines 135. The digital line interface card tester 120 is also able to command the communications test set 130, via an RS232 communications port 137, to perform various communications tests and telephone line simulations on the line card 110 using the tip and ring lines 135.

In addition, The communications test set 130 is capable of making various measurements. These include voltage levels, transmission loss, noise levels, frequency and return loss. In addition, the test set 130 provides a typical telephone termination.

Results of all of the tests and measurements performed by the communications test set 130 are returned to the line card tester 120 via the RS232 communications port 137.

FIG. 2 is a block diagram of the digital line card tester. The MPU 240 controls all tests which are being performed in conjunction with a human machine interface 245. The human machine interface, consists of a keypad 250, a video display driver 260 and a CRT 270. Commands may be typed into the keypad 250 to condition the MPU 240 to perform specific tests. The results of these tests may be displayed to the user on the CRT 270 via the video display driver 260. The MPU 240 communicates with the communications test set 130 and the telephone line interface card 110 via the MDIB 230.

The SPU 210 is used to transmit various data sequences (i.e. commands and PCM encoded voice and tone signals) to the telephone line interface card 110. The SPU 210 communicates with the telephone line interface card 110 via the SDIB 220.

In actual operation, the MPU 240 signals the SPU 210 to transmit a specific pattern of digital data to the telephone line interface card 110. The SPU 210 transmits a sequence of data through the SDIB 220 to the telephone line interface card 110 The interface card, in response, will transmit a digital stream of data to the MPU 240 via the MDIB 230. The interchange of data between the MPU and the interface card occurs over a common bidirectional bus 215. While the MPU 240 is analyzing the data which the unit under test has transmitted, it may notify the SPU 210 to initiate the transmission of a second data sequence. Upon reception at the MPU, the data stream which has been transmitted by the unit under test 110 in response to this second data sequence may be analyzed. In this manner the SPU may be transmitting data to the unit under test while the MPU is simultaneously analyzing data received from the unit under test.

Figure 3:
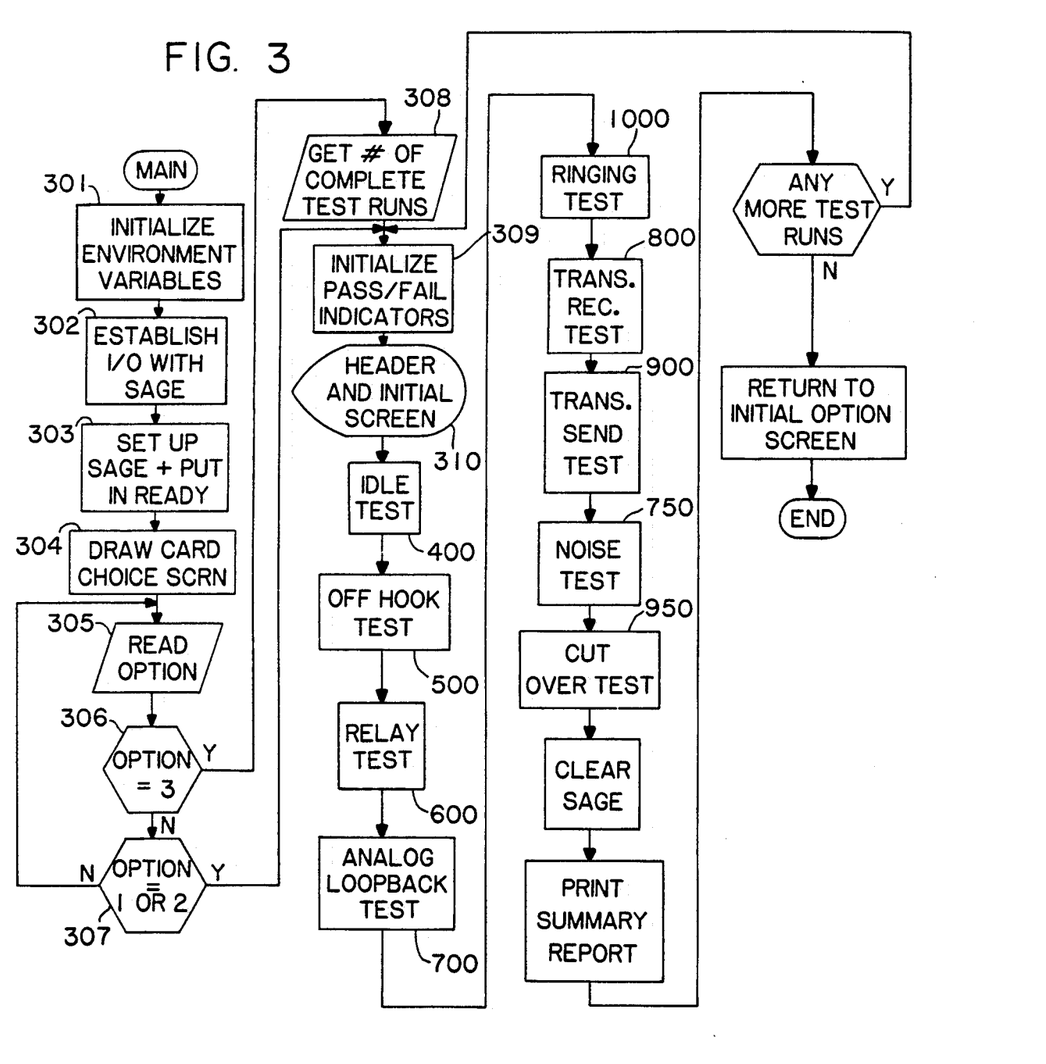
FIG. 3 is a flow chart diagram of processing within the telephone line interface card tester.

FIG. 3 is a flow chart diagram which illustrates processing within the digital line interface card tester. Processing consists of initializing the test equipment, performing numerous tests, and reporting results.

At step 301 the processing components within the telephone line interface card tester are initialized. At steps 302 and 303 the telephone line interface card tester initializes the communications test set 130.

At step 304, a menu is displayed on the CRT 270. This menu allows the user to choose the type of card to be tested and the total number of times that a complete test series will be executed.

At step 305 the user's choice is entered via the key pad 250. This value is transmitted to the MPU 240 via the MDIB 230. Depending on the value which is received by the MPU 240 the complete series of tests will be executed once or a specified number of times. If the user has specified that the complete test run is to occur more than once, the user is prompted to enter the total number of times test runs are desired. This is shown in the flow chart diagram at step 308.

At step 309, the MPU 240 initializes the pass/fail indicators of various tests. The header and initial screen are displayed at step 310

A series of tests are performed, at steps 400 through 900, to evaluate the operational integrity of the telephone line interface card. The purpose of each test will be briefly summarized. Details of exemplary tests are described following this summary.

Idle test (Step 400): This test ensures that the telephone line interface card is properly responsive to an idle command. An idle command is issued when an interface card is not in use, that is, when the subscriber is not using the telephone.

Off-hook test (Step 500): This test ensures that the telephone line interface card is properly responsive to an off-hook condition. An off-hook condition exists when a subscriber lifts the handset from the base of a telephone set.

Relay test (Step 600): This test ensures that the all relays within the telephone line interface card operate properly. The exemplary Northern Telecom card includes three relays: Cut-over, Test-access and Ring. None of these relays is shown in the figures. The Cut-over relay is normally closed; when operated, it isolates the line card 110 from the subscriber tip and ring lines 217. The Test-access relay is normally open; when operated, it connects the subscriber tip and ring lines to a test access port which is normally coupled to the central office scanner. The Ring relay is a pair of normally open and normally closed relays. When operated, these relays disconnect the tip and ring lines from a source of reference potential (e.g. ground) and a source of operation potential (e.g. −48 volts) and connect them instead to a ringing signal supplied by the central office switch via dedicated tip and ring lines.

Analog loop-back test (Step 700): This test ensures that the analog loop-back function is operating properly by enabling the cut-over relay (not shown), sending a digital voice tone to the telephone line interface card 110 and measuring the reflected voice response as received over the bidirectional bus 215. The cut-over relay disconnects the card 110 from the tip and ring lines 217. This leaves the output of the line interface card 110 unterminated, causing any analog signal which would be provided to these lines to be reflected back through the analog-to-digital and digital-to-analog converter (CODEC) (not shown) on the card 110. A digital representation of the reflected signal is produced at the central office port 215 of the line card 110.

Ringing test (Step 1000): This test ensures that the telephone line interface card can supply a ringing voltage to the subscriber and can detect an off-hook condition during the alternating ringing and silent intervals which constitute the ringing signal.

Transmission-receive test (Step 800): This test measures the telephone line interface card's ability to convert PCM encoded voice data received at the central office port into an analog voice signal. The analog signal is applied to the network port for transmission over the tip and ring lines 135 to the communications test set 130. This test includes additional test sequences in which commands are given to the line interface card to attenuate a voice signal being received via the tip and ring lines.

Transmission-send test (Step 900): This test ensures that the telephone line interface card properly converts an incoming sine wave applied to the tip and ring lines 135 by the communications test set 130 into PCM digital data. This PCM data is provided to the master data interface board 230 via the bidirectional bus 215.

Cut-over test (Step 950): This test ensures that the cut-over relay (not shown) will not release when the cut-over hold lead (not shown) is active and that an active cut-over hold lead will not activate the cut-over relay.

Details of several exemplary tests follow. While these steps are incorporated into an exemplary embodiment of the invention, these details are disclosed to illustrate fundamental design principles only. It is understood that implementation of the present invention is not limited to the steps disclosed.

Figure 4:
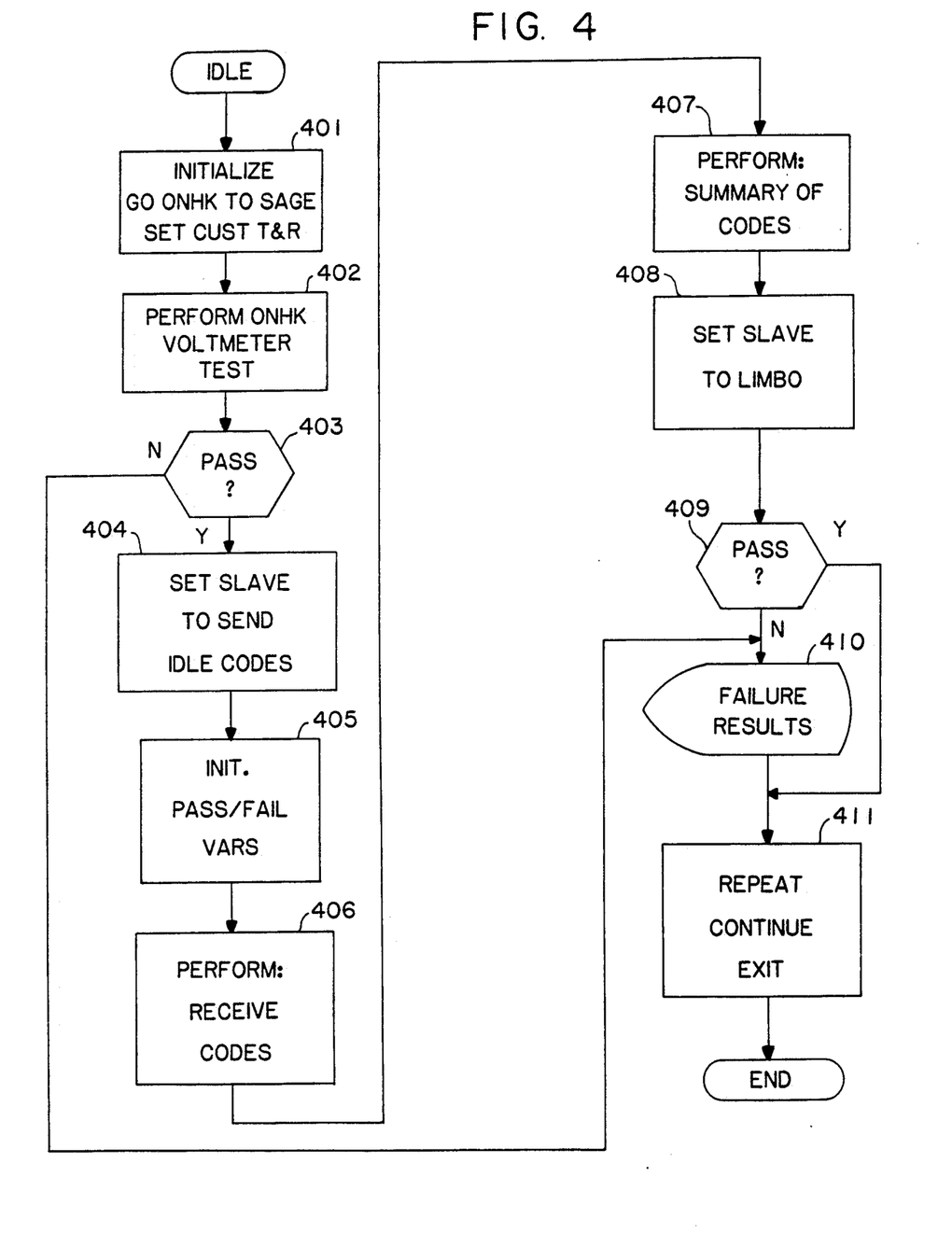
FIG. 4 is a flow chart diagram of an idle test performed by the telephone line interface card tester.

The idle test, step 400, ensures that the telephone line interface card 110 is properly responsive to an idle command. The test consists of two parts. In the first part, on-hook voltages of ring to tip, ring to ground, and tip to ground are measured. These voltages should be +48 volts, −48 volts, and 0 volts, respectively, ±3 volts. Furthermore, when the card 110 is placed in an idle state, it is expected to repeatedly transmit a digital code which is indicative of this fact. The second part of the idle test is to ensure that this code is indeed transmitted when the card is in an idle state.

In FIG. 4, a flow chart representation of the idle test is presented. At step 401, the telephone line interface card is set to an on-hook environment. At step 402, the communications test set 130 measures the three voltages previously discussed. At step 403, the results of this test are evaluated. If the voltages measured are not as expected, program control switches to step 410, at which point failure results are displayed. At step 411, the user is given the option, via the user interface 245, of repeating the test, continuing on to the next test or exiting from the test environment.

If at step 403 proper results are obtained, control passes to step 404, at which point the MPU 240 instructs the SPU 210 to send a ten-bit code to the line card under test 110. This code conditions the line card 110 to enter an idle state. For the line card to operate properly, this idle state code should be continually transmitted to the card 110. The disclosed invention is particularly suited for this application. While the SPU 210 transmits codes which place the interface card into an idle state, the MPU 240 can analyze status commands being received from the line card under test, including whether the line card 110 stays in an idle mode.

At step 405, the MPU 240 expects to receive values which are transmitted by the line card in response to the codes transmitted at step 404. At step 406, the MPU 240 receives the response codes from the line card 110. At step 407, the MPU 240 evaluates the received codes to ensure that the card 110 is still in its idle mode. At step 408, the MPU 240 instructs the SPU 210 to hold the line card 110 in idle mode. At step 409, the operation of step 407 is evaluated. If results are as expected, control of the program passes to step 411 at which point "Pass" is displayed on the CRT 270 next to "IDLE TEST" and the test sequence advances to "OFF-HOOK TEST." If the evaluation at step 407 determines that the codes received are not as expected, then failure results are displayed to the user at step 410, and the test advances to step 411.

Figure 5:
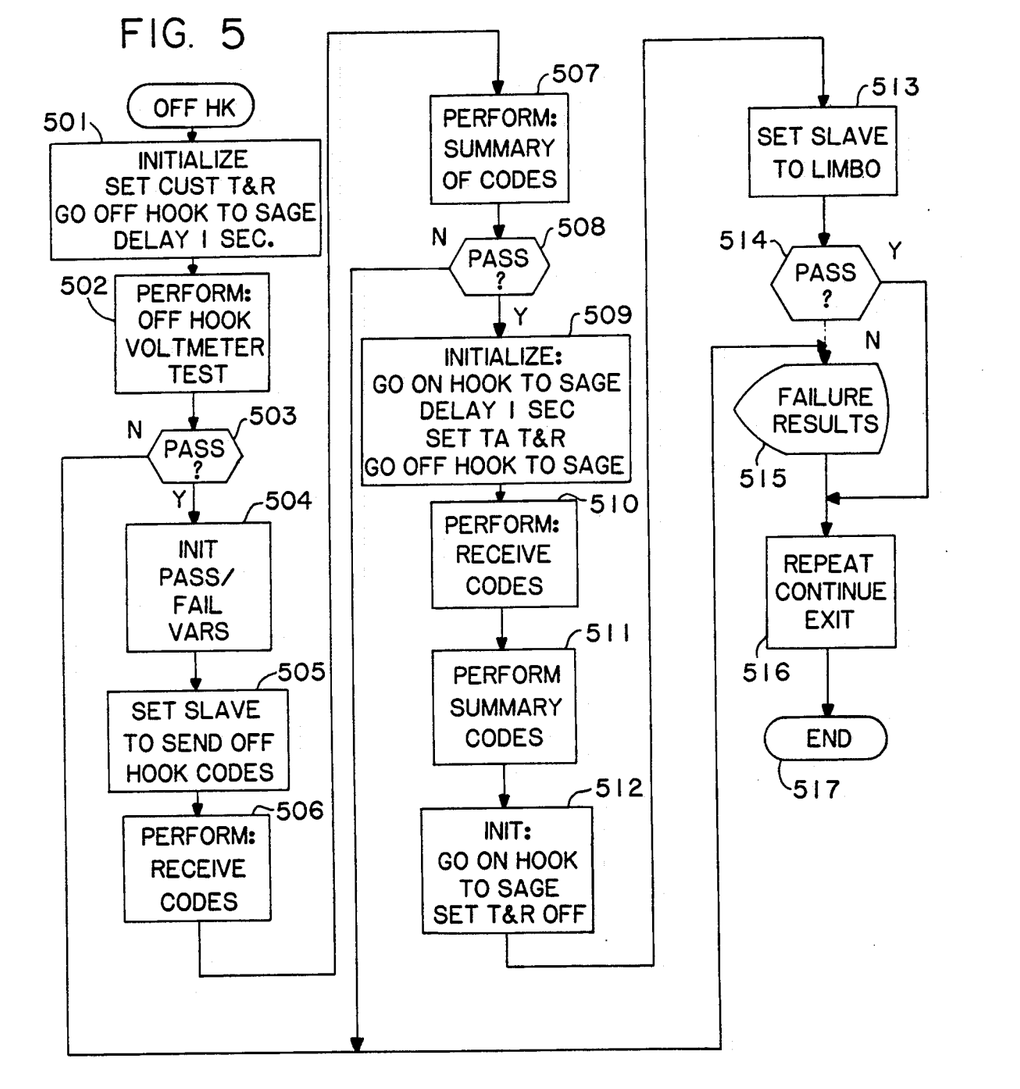
FIG. 5 is a flow chart diagram of an off-hook test performed by the telephone line interface card tester.

The off-hook test ensures that the telephone line interface card 110 is properly responsive to an off-hook condition. The test consists of checking off-hook voltages in a short loop (e.g. 180 ohms between tip and ring) environment, checking the line interface card response to an off-hook signal in a short loop environment, and checking the line interface card response to an off-hook condition in a long loop (e.g. 1,680 ohms between tip and ring) environment.

FIG. 5 is a flow chart diagram of the operation of the line interface card tester during the off-hook test. At step 501, the communications test set 130 is conditioned by the MPU 240 to conform the tip and ring lines 135 to a short-loop off-hook state. There is a one second delay between steps 501 and 502 to allow the potentials on the tip and ring lines 135 to stabilize. At step 502, the communications test set 130 measures the voltages of ring to tip, ring to ground, and tip to ground. These voltages should be +15 volts, −30 volts, and −15 volts, respectively, ±3 volts. At step 503, the results of step 502 are evaluated. If voltages are as expected, control proceeds to step 504. If results are not as expected, control passes to step 515 at which point failure results are displayed on the CRT 270.

At step 504, the processors 240 and 210 are set up for the remaining test sequences of the off-hook test. At step 505, the SPU 201 is commanded by the MPU 240 to send an off-hook signal to the card under test 110. The architecture of this tester allows this signal to be continually transmitted to the line card 110 while the responses of the card are evaluated by the MPU 240. At step 506, the MPU 240 receives the codes which are transmitted by the card 110 in response to the codes transmitted to the card at step 505. The received codes are evaluated at step 507. At step 508, if the received codes are as expected, that is, if the card 110 sends a code indicating that is in an off-hook state, program control proceeds to step 509. Otherwise program control proceeds to step 515 at which point failure results are displayed to the user on the CRT 270. At step 509, the communications test set conforms tip and ring lines 135 to an on-hook state, delays for one second to allow the signals on the lines to stabilize, and then conforms tip and ring to an off-hook state. At step 510, the MPU 240 receives a code from the line card 110 responsive to the off-hook condition and the code is evaluated at step 511. At step 512, the communications test set is conditioned to place the lines tip and ring into an on-hook state. At step 513, the SPU is commanded to send idle codes to the line card 110. At step 514, the results obtained in step 512 are evaluated. If results are as expected, then control passes to step 516 where "Pass" is displayed on the CRT 270 next to "OFF-HOOK TEST" and the test sequence advances to "RELAY TEST." If the results of step 512 are not as expected, program execution switches to step 515 at which point failure results are displayed to the user. Next, program execution advances to step 516.

Figure 6:
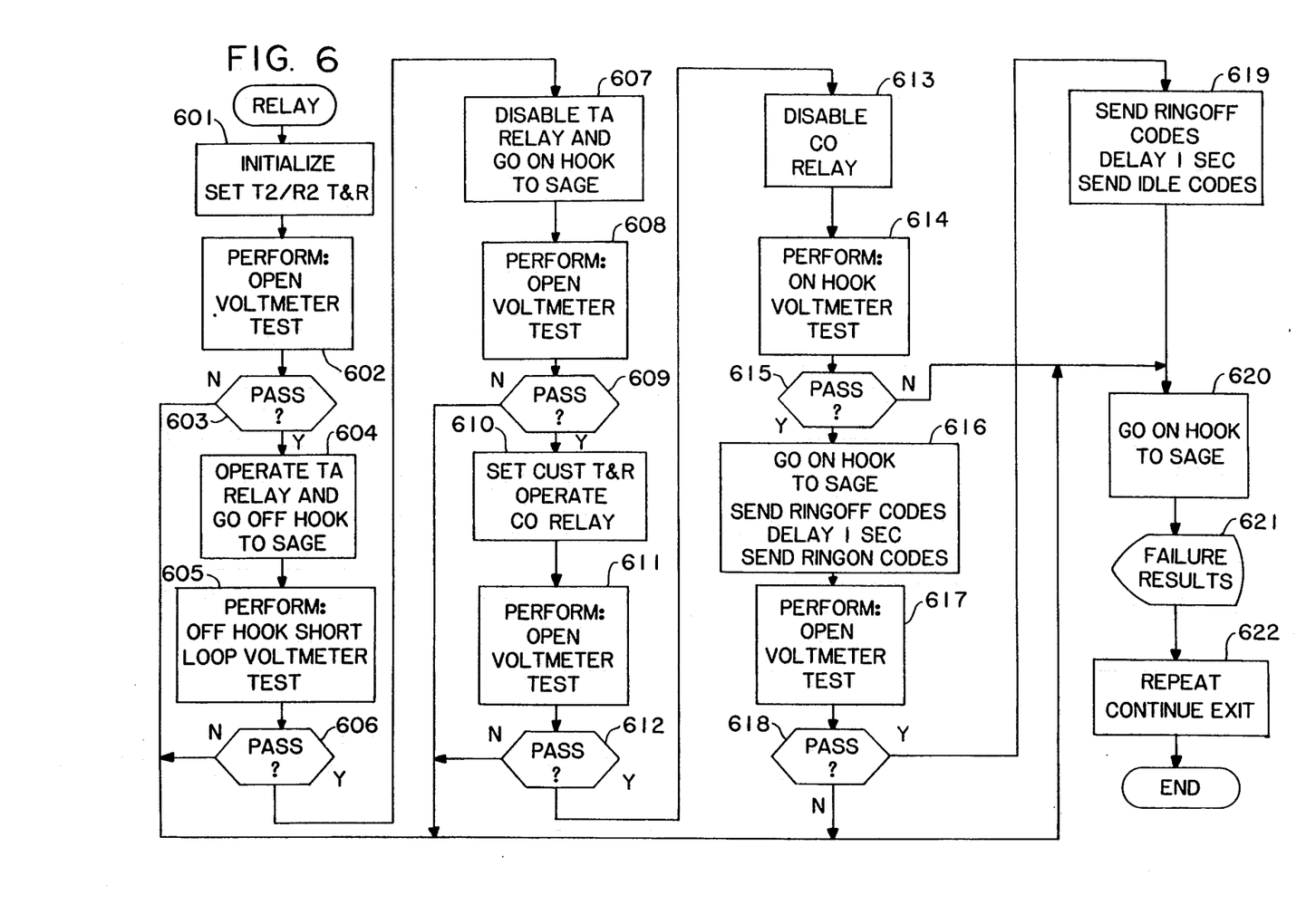
FIG. 6 is a flow chart diagram of a relay test performed by the telephone line interface card tester.

The relay test ensures that all relays within the telephone line interface card are properly operational. The test ensures that the test-access and cut-over relays are each properly operational both in an open connection (on-hook) and off-hook state and that the ring relays are properly operational in an open connection state.

In FIG. 6 a flow chart diagram of the relay test is shown. At step 601, the tip and ring lines, 135 of the communications test set 130 are routed to the test-access tip and ring lines (not shown) of the line card 110. At step 602, the test set 130 measures the voltages of ring to tip, ring to ground and tip to ground and reports the results to the MPU 240. Each of these voltages should be 0 volts ±3 volts. At step 603, if voltages are as expected then control passes to step 604. Otherwise, control passes to step 620 for further processing. At step 604, the SPU 210 sends a code to the interface card 110 which operates the test-access relay. This command should connect the communications test set 130 to the tip and ring lines 217 of the line card 110. The communications test set 130 then places the tip and ring lines 217 into an off-hook state. At step 605, a short-loop voltmeter test is performed. The voltages of tip to ring, ring to ground, and tip to ground are evaluated. These voltages should be +15 volts, −30 volts, and −15 volts, respectively, ±3 volts. At step 606, if voltages are as expected, then control proceeds to step 607. Otherwise, control passes to step 620. At step 607, the TA relay is released and, so, the tip and ring lines 217 are disconnected from the test set 130 and are in an on-hook state. At step 608, the voltages of ring to tip, ring to ground, and tip to ground are evaluated. Each of these voltages should be 0 volts ±3 volts. At step 609, if the voltages are as expected, then control transfers to step 610. Otherwise, control passes to step 620.

At step 610, the cut-over relay is operated. At step 611, the voltage of ring to tip, ring to ground, and tip to ground are evaluated. Each of these voltages should be 0 volts ±3 volts. At steps 613 and 614 the cut-over relay is deactivated and an on-hook voltmeter test is performed. The expected voltages are 0 volts and −48 volts for tip to ground and ring to ground, respectively. If this test fails, then control transfers to step 620. Otherwise, control transfers to step 616.

At step 616, the test device 130 places tip and ring into an on-hook state. The line card 110 receives codes which prepare the ring relay to be operated after a delay of one second, the line card 110 receives codes that operate the ring relay, all of these codes are issued by the MPU 240. At step 617, the test device 130 performs an open voltmeter test. All of the voltages: tip to ring, tip to ground and ring to ground should be zero ±3 volts. If these voltages are as expected, then control proceeds to step 619. Otherwise control proceeds to step 620. At step 619, the master CPU 240 transmits a signal to the line card under test, which releases the ring relay. There is a one second delay and then the MPU 240 then transmits a code to the line card under test 110, which will place the card into an idle state. At step 620, the communications test set 130 places the tip and ring lines 135 into an on-hook state. At step 621 any failure results from any of the relay tests are reported to the user on the screen of the CRT 270. At step 622, if the test was successful, the word "Pass" is displayed on the CRT 270 next to "RELAY TEST."

Figure 7:
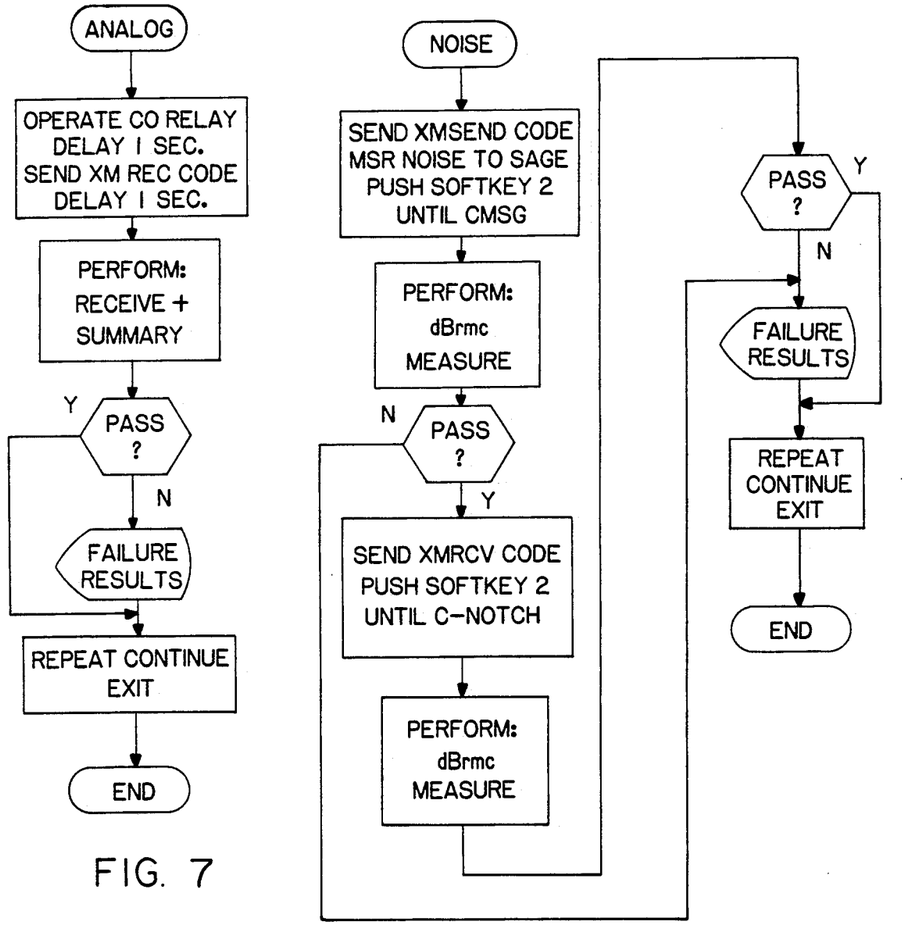
FIG. 7 is a flow chart diagram of analog loop-back and noise tests performed by the telephone line interface card tester.
Figure 8:
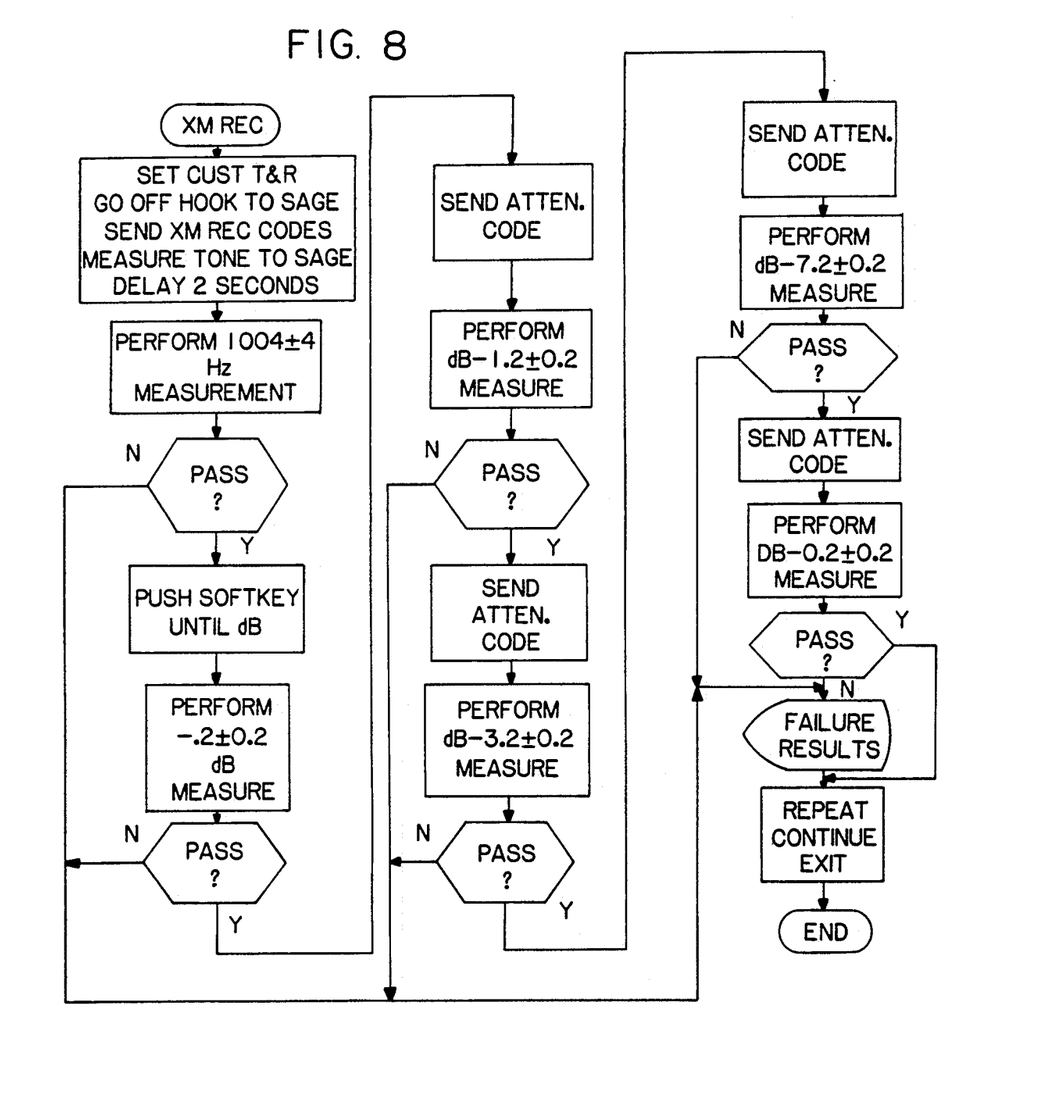
FIG. 8 is a flow chart diagram of a transmission-receive test performed by the telephone line interface card tester.
Figure 9:
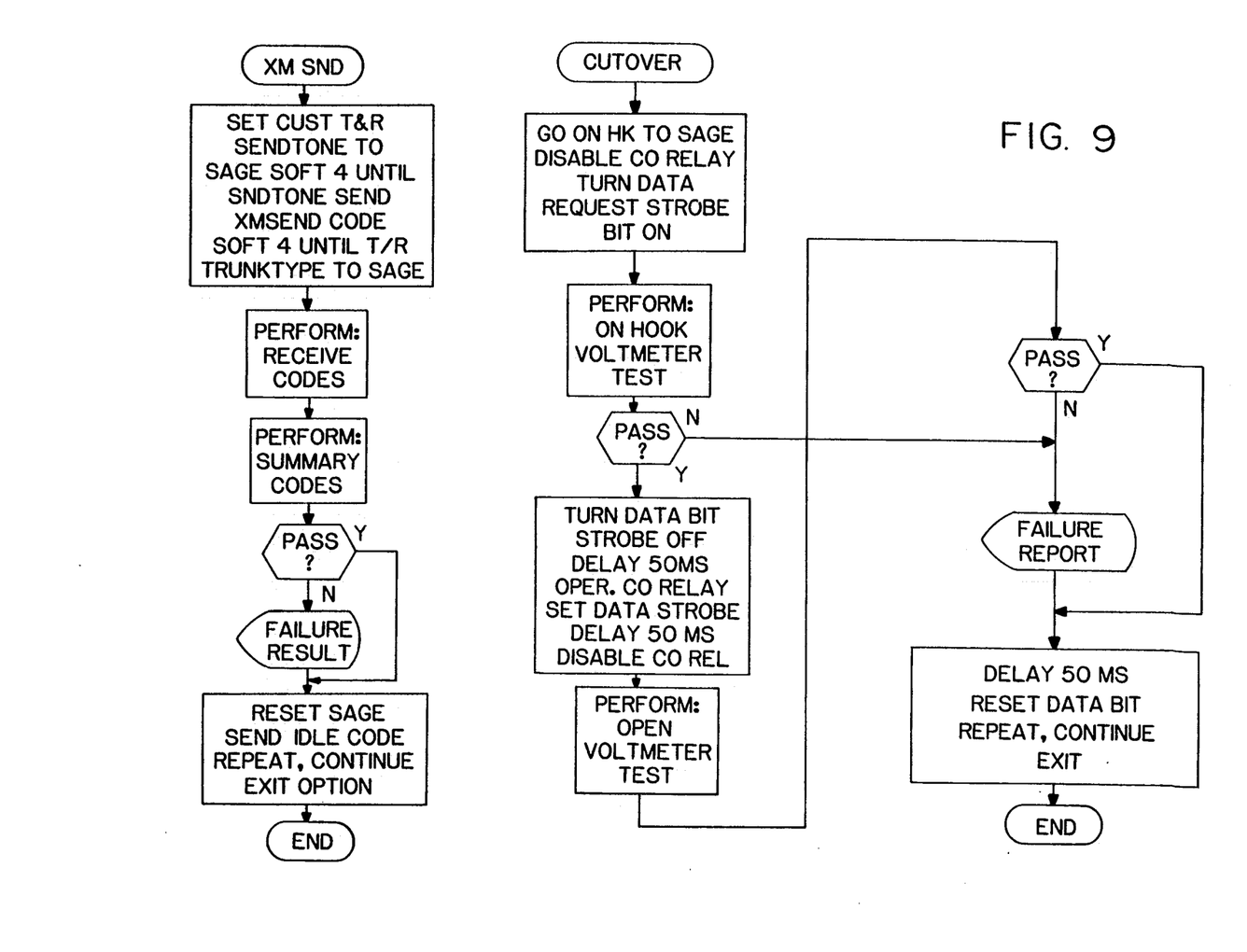
FIG. 9 is a flow chart diagram of a transmission-send test and a cut-over control test performed by the telephone line interface card tester.

FIG. 7 illustrates the steps performed for the analog loop back and noise tests; FIG. 8, the steps for the transmission receive test; and FIG. 9, the steps for the transmission send and cutover control tests. These tests are easily understood by one ordinarily skilled in the art from the preceeding discussion and, so, are not described in detail.

Figure 10:
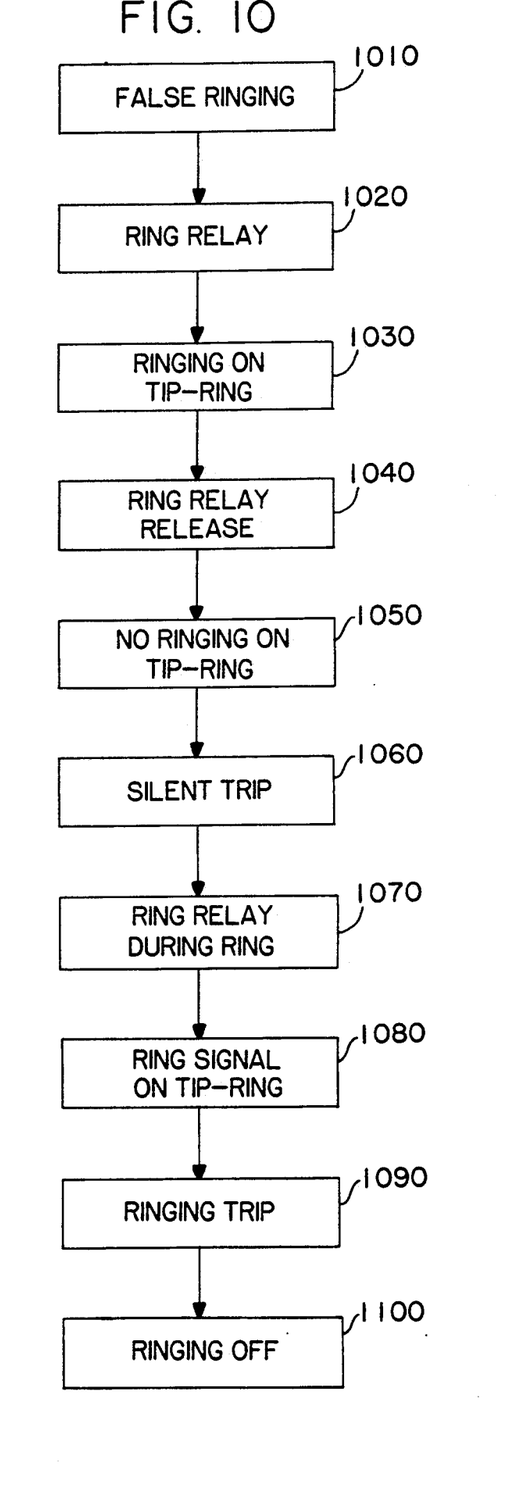
FIG. 10 is a flow chart diagram of a ringing test performed by the telephone line interface card tester.

The ringing test includes a series of subtests which are shown in FIG. 10. Before executing any of these tests, the communications test set 130 is programmed to provide a ringing signal to the master data interface board 230 via the tip and ring lines 135. Relays (not shown) internal to the interface board 230 are operated to route this signal to a pair of ring input lines 132 on the line interface card 110. These lines are known as ring-tip and ring-ring. The presence of a ringing signal on the tip and ring lines 217, which are the lines that connect to the subscriber's telephone, is sensed in the master data interface board using a test point (not shown) which detects an alternating current (AC) signal on the lines 217.

Referring to FIG. 10, the first subtest is for false ringing. In this test, a ringing signal is applied to the line card 110 using the communications test set 130 but the ring relay on the line card is not activated. If the line card 110 is operating properly, the ringing signal should not be present on the subscriber tip and ring lines 217. The false ringing test can be summarized in a series of steps. First, the MPU 240 determines that a ringing signal is being provided by the test set 130. This determination ignores the silent intervals in the ringing sequence. When a ringing signal is detected and the MPU 240 determines that the ringing signal may be applied to the subscriber tip and ring lines 217. This signal should not be applied, however, since the ring relay has not been operated. The MPU 240 monitors the test point on the interface board 230, to determine if an AC signal is present on the lines 217. If so, an error message "AC DETECTED ON TIP AND RING" is displayed on the CRT 270.

The next subtest, 1020, checks the operation of the ring relay. In this test, the MPU 240 issues a command to the line card 110 to deactivate the ring relay, monitors the ring signal provided by the test set 130 to find an instant immediately before the ring relay would be activated, activates the ring relay, and then monitors the codes received from the line card 110 to determine if the relay was activated at the proper time. If the returned code indicates that the ring relay was not activated, then a message "RG OPERATE CARD RESPONSE FAILURE" is displayed on the CRT 270.

In subtest 1030, the MPU 240 monitors the test point of the master data interface board 230 to determine if an AC signal is present on the subscriber tip and ring lines 217. If this signal is detected, then the ring signal enabled in the last part of the subtest 1020 is present on the tip and ring lines 217. If no AC signal is detected, an error message "NO RINGING DETECTED" is displayed on the CRT 270.

Next, is subtest 1040, after a delay of two seconds, the ring relay is deactivated. The MPU 240 then reads the response codes returned by the line card 110 via the bidirectional bus 215 to determine if the ring relay was, in fact, deactivated. If not, an error message "RG RELEASE CARD RESPONSE FAILURE" is displayed on the CRT 270.

After the line card 110 has responded indicating that the ring relay has been released, subtest 1050 is performed to ensure that there is no ringing signal on the subscriber tip and ring lines, 217. To do this, the MPU 240 monitors the test point in the master data interface board 230 which indicates whether an AC signal is present on the tip and ring lines 217. If an AC signal is found, an error message "RINGING DETECTED" is displayed on the CRT 270.

Subtest 1060 checks for off-hook detection in a non ringing state. For this test, the MPU 240 conditions the communications test set 130 to provide an off-hook state to the subscriber tip and ring lines 217. The MPU 240 then monitors the response from the line card to determine if the off-hook condition has been detected. If it is not detected, an error message "SILENT TRIP FAILURE" is displayed on the CRT 270.

Subtest 1070 checks for proper operation of the ring relay during a ringing signal. In the test, the MPU 240 first conditions the MDIB 210 to provide an on-hook (open circuit on tip and ring) condition to the line card 110. Next, after a delay of three seconds, the MPU 240 conditions the SPU 210 to send a ring command to the line card 110. The MPU 240 then monitors the ring signal provided by the communications test set 130 until a negative-going transition of the ring signal is detected. At this instant, the ring relay is operated via commands sent to the line card 110 by the SPU 210. After a delay of 13 milliseconds (ms), the MPU 240 checks the codes returned by the line card 110 to determine if the ring relay has been activated. If it has not been activated, an error message "RG OPERATE CARD RESPONSE FAILURE" is displayed on the CRT 270.

In the next subtest, 1080, the MPU 240 checks for ringing on the subscriber tip and ring lines 217 by monitoring the test point on the message data interface board 230. If the signal value at this test point indicates that no AC signal is present on the subscriber tip and ring lines 217, then an error message "NO RINGING DETECTED" is displayed on the CRT 270.

The next subtest, 1090, checks for detection of an off-hook condition during ringing. For this test, the MPU 240 waits one second and then applies an off-hook long loop termination (e.g. 1680 ohms) to the tip and ring lines 217 via the MDIB 230. After a further delay of 100 ms, the MPU 240 reads the codes returned by the line card 110 to determine if the off-hook condition has been detected and the ring relay has been deactivated. If either of these conditions has not been met, an error message "RINGING TRIP FAILURE" is displayed on the CRT 270.

In the last subtest, 100, the MPU 240 conditions the SPU 210 to send a code to the line card 110 to deactivate the ring relay. After a delay of 250 ms, the MPU 240 checks the test point on the master data interface board 230 for the presence of an AC signal on the subscriber tip and ring lines 217. If an AC signal is detected, an error message "RINGING DETECTED" is displayed on the CRT 270.

At the end of the ringing test, the MPU 240 clears the communications test set 130, reconnects the subscriber tip and ring lines 217 to the tip and ring lines 135 of the communications test set and conditions the SPU 210 to continually transmit idle codes to the line card 210.

The disclosed invention is well suited for use in numerous sections of the ringing test. In particular, several of these tests require digital codes to be continuously transmitted to line interface card 210, while the status messages previously provided by bidirectional bus or potentials provided by the tip and ring lines of the card are being evaluated.

For example, checking RG relay operation requires that the CODEC of the line card 110 be put in a non ring state before it is put in a ring state. Thus, while the SPU transmits codes which alter the state of the codec, the MPU can analyze status commands being received from the line card 110, including any RG relay failure messages.

While this invention has been described in the context of an exemplary embodiment, it is contemplated that the invention may be practiced as described above with modifications within the spirit and scope of the appended claims.

The invention claimed is:

1. Apparatus suitable for testing a line interface card (LIC) for communication system applications, said LIC including a single data terminal for alternately transmitting data from said LIC and receiving data at said LIC, said apparatus comprising:

a bidirectional data bus including a single conductor for coupling to the single data terminal of said LIC;

first processing means, coupled to the single conductor of said bidirectional data bus, for receiving and analyzing data which is produced by the LIC; and second processing means, physically distinct from said first processing means and coupled to the single conductor of said bidirectional data bus, for transmitting data to the LIC.

2. The apparatus set forth in claim 1 wherein said first processing means includes means for controlling said second processing means.

3. The apparatus set forth in claim 1 wherein said LIC is a line interface card for coupling a telephone to a telephone switching network.

4. The apparatus set forth in claim 3 further including:

means, coupled to said second processing means for transmitting telephone network signals to said LIC; and means, coupled to said first processing means, for receiving telephone network signals from said LIC.

5. The apparatus set forth in claim 4, wherein said first processing means includes means for controlling said means for transmitting telephone network signals and said means for receiving and analyzing telephone network signals.

6. A method of testing a line interface card (LIC) for communication system applications, wherein the LIC transmits and receives commands and data via a single terminal coupled to a bidirectional bus, said method comprising the steps of:

(a) continually transmitting commands to the LIC which place the LIC in a predetermined state;

(b) receiving and analyzing responses provided by the LIC which indicate the state of the LIC; and (c) displaying an error message if the response provided by the LIC indicates that the LIC is not in the predetermined state.

7. A method of testing a line interface card (LIC) for communication system applications, wherein a first processor receives and analyzes data which is produced by the LIC and a second processor transmits data to the LIC, wherein the LIC transmits and receives data on a single conductor of a bidirectional bus, said method comprising the steps of:

(a) transmitting data to the LIC; and (b) receiving and analyzing data which is produces by the LIC in response to the data transmitted to the LIC.

8. The method set forth in claim 7, wherein said LIC includes means for coupling a telephone to a telephone network, said method comprising the steps of:

(a) transmitting telephone network signals to said LIC during a predetermined time interval;

(b) receiving and analyzing telephone network signals from said LIC during a time interval substantially exclusive of said predetermined time interval.

9. The method set forth in claim 8, wherein the first processor controls the transmission, reception and analysis of the telephone network signals.

10. In a test fixture having a master processor coupled to a bidirectional data bus and a communications test set, a method of automatically performing an idle test on a telephone line interface card having tip and ring lines coupled to said bidirectional data bus and to said communications test set said method comprising the steps of:

(a) conditioning said communications test set, via a command from said master processor, to place the lines tip and ring, coupled to said communications test set, into a state indicating an on-hook condition;

(b) transmitting, in response to a command from said master processor, an idle command to the telephone line interface card over the bidirectional bus, said idle command tending to condition said telephone line interface card to assume an idle state;

(c) receiving at said master processor a response code from the telephone line interface card, in response to the transmission of said idle command, over the bidirectional bus; and (d) generating, at said master processor, an error message if the response code indicates that the line interface card is not in said idle state.

11. The method of claim 10, wherein:

step (a) includes the additional step of measuring the respective voltages of tip and ring relative to a predetermined reference potential; and step (d) includes the additional step of generating an error message if the measurement of any one of said voltages produces a value which is not within a predetermined range of acceptable values.

12. In a test fixture having a master processor coupled to a bidirectional bus having a single conductor for transmitting commands and data and for receiving responses and data, a method of automatically performing a ringing test on a telephone line interface card having tip and ring lines for coupling to a subscriber telephone set, said telephone line interface card having a single terminal coupled to the bidirectional bus for receiving commands and data and transmitting responses and data and being controllable for selectively applying a ring signal to said tip and ring lines, said method comprising the steps of:

(a) transmitting, from said master processor, a command to the telephone line interface card via the single conductor of said bidirectional bus, wherein said command conditions the telephone line interface card to apply the ring signal to said tip and ring lines;

(b) receiving, from said telephone line interface card via the single conductor of said bidirectional bus, a response at the master processor, responsive to the transmission of the command code; and (c) generating, at said master processor, an error indication signal if the response received from the line interface card indicates that said ring signal is not applied to said tip and ring lines.

13. The method set forth in claim 12 further including the steps of:

(d) monitoring, via said master processor, said tip and ring lines to determine if said ring signal has been applied thereto; and (e) generating an error indication signal at said master processor if said ring signal is not detected in step (d).

14. The method set forth in claim 13 further including the steps of:

(f) transmitting, from said master processor, a further command to said telephone line interface card, said further command tending to condition said telephone line interface card to not apply the ring signal to the tip and ring lines;

(g) receiving from said telephone line interface card a further response, responsive to said further command;

(h) generating, as said master processor, an error indication signal if the further response indicates that said ring signal is applied to said tip and ring lines.

* * * * *